US012630226B2

(12) United States Patent
Jeong

(10) Patent No.: US 12,630,226 B2
(45) Date of Patent: May 19, 2026

(54) VEHICLE FRAME ASSEMBLY

(71) Applicants: HYUNDAI MOTOR COMPANY, Seoul (KR); KIA CORPORATION, Seoul (KR)

(72) Inventor: Seung Min Jeong, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 282 days.

(21) Appl. No.: 18/497,755

(22) Filed: Oct. 30, 2023

(65) Prior Publication Data

US 2024/0308591 A1 Sep. 19, 2024

(30) Foreign Application Priority Data

Mar. 17, 2023 (KR) ........................ 10-2023-0035189

(51) Int. Cl.
| | |
|---|---|
| *B62D 21/15* | (2006.01) |
| *B60R 16/04* | (2006.01) |
| *B62D 21/03* | (2006.01) |
| *B62D 25/02* | (2006.01) |

(52) U.S. Cl.
CPC ........... *B62D 21/157* (2013.01); *B60R 16/04* (2013.01); *B62D 21/03* (2013.01); *B62D 25/025* (2013.01)

(58) Field of Classification Search
CPC .... B62D 21/157; B62D 21/03; B62D 250/25; B60R 16/04
See application file for complete search history.

(56) References Cited

U.S. PATENT DOCUMENTS

| | | | |
|---|---|---|---|
| 8,939,246 B2 | 1/2015 | Yamaguchi et al. | |
| 10,967,912 B2 | 4/2021 | Toyota | |
| 11,136,069 B2 | 10/2021 | Ahn et al. | |
| 2009/0058142 A1* | 3/2009 | Park | B62D 21/00 |
| | | | 296/193.07 |
| 2018/0237075 A1* | 8/2018 | Kawabe | B60L 50/66 |
| 2020/0324827 A1 | 10/2020 | Ahn et al. | |

(Continued)

FOREIGN PATENT DOCUMENTS

| | | |
|---|---|---|
| JP | H0781625 A | 3/1995 |
| JP | 2936955 B2 | 8/1999 |
| JP | 4349038 B2 | 7/2009 |

(Continued)

*Primary Examiner* — Edwin A Young
(74) *Attorney, Agent, or Firm* — Lempia Summerfield Katz LLC

(57) ABSTRACT

A vehicle frame assembly includes: a battery cross member extending in a widthwise direction of a vehicle and supporting a battery pack; a chassis frame provided outside the battery cross member and connected to a side of the battery cross member; a floor cross member extending in the widthwise direction of the vehicle above the battery cross member and the chassis frame; and a body side sill extending in a longitudinal direction of the vehicle and arranged outside the chassis frame and the floor cross member to define an internal space where a stiffener is secured therein. A connecting bracket is connected at one surface thereof to the stiffener and connected at the other surface to the floor cross member so that the body side sill and the floor cross member form a load path for an impact caused by a broadside collision.

18 Claims, 7 Drawing Sheets

(56)                    References Cited

U.S. PATENT DOCUMENTS

2022/0144063 A1*   5/2022   Tatsuwaki ........... H01M 50/249

FOREIGN PATENT DOCUMENTS

| JP | 5040343 B2 | 7/2012 |
| JP | 2020055473 A | 4/2020 |
| JP | 6734709 B2 | 7/2020 |
| JP | 2021112924 A | 8/2021 |
| KR | 101947480 B1 | 2/2019 |
| KR | 20200119587 A | 10/2020 |

* cited by examiner

VEHICLE FRAME ASSEMBLY

CROSS-REFERENCE TO RELATED APPLICATIONS

The present application claims priority to Korean Patent Application No. 10-2023-0035189, filed Mar. 17, 2023, the entire contents of which are incorporated herein for all purposes by this reference.

BACKGROUND

1. Technical Field

The present disclosure relates to a vehicle frame assembly. More particularly, the present disclosure relates to a vehicle frame assembly that forms a load path for an impact caused from a collision.

2. Description of the Related Art

Recently, a purpose-built vehicle (PBV) is being introduced as a modularized device having a simple structure that may be designed by reflecting various requirements at a desired time. The PBV is an eco-friendly and multi-purpose mobility vehicle that may be provided at low cost depending on the customers' business purposes and needs.

Therefore, the PBV has adopted a structure in which various purpose vehicle bodies based on hailing/delivery characteristics are coupled to an upper portion of the chassis frame so as to secure passenger rideability and luggage loading convenience. On the other hand, as the above-described structure is adopted, a sliding door is applied to the PBV to further secure passenger rideability and luggage loading convenience. As a result, a body side sill is disposed at a lower position as compared to the floor cross member.

As the body side sill is disposed at a lower position than the floor cross member, a height difference between the floor cross member and the body side sill reinforcing structure increases. The height difference poses a problem as it weakens the structure's ability to provide protection against an impact from a broadside collision.

The description provided above as the related art of the present disclosure is to help in understanding the background of the present disclosure. The description provided above as the related art of the present disclosure should not be construed as being included in the related art known by those having ordinary skill in the art.

SUMMARY

The present disclosure provides a vehicle frame assembly of a vehicle having a sliding door. In particular, the vehicle frame assembly forms a load path for an impact from a broadside collision through an efficient connecting structure between a battery cross member, a chassis frame side member, a body side sill, and a floor cross member. As a result, the vehicle frame assembly maximizes the torsional rigidity and connectivity of a vehicle. Additionally, the vehicle frame assembly can distribute an excessive load caused by a large-capacity battery mounted on a lower portion of the vehicle to each member, thereby improving safety against the impact from a broadside collision.

In one embodiment of the present disclosure, a vehicle frame assembly includes a floor cross member provided on a body floor of a vehicle and extending in a widthwise direction of the vehicle. The vehicle frame assembly also includes a body side sill provided on an outside of the vehicle of the floor cross member, connected to the floor cross member, and defining an internal space. A stiffener is secured in the internal space of the body side sill. The vehicle frame assembly also includes a chassis frame provided on a lower portion of a vehicle body, and disposed inside the vehicle compared to the body side sill. A battery pack is mounted on the chassis frame, and the body side sill is connected to a side of the chassis frame. The floor cross member, the body side sill, and the chassis frame may be connected to each other, thereby forming a load path for an impact from a broadside collision.

The vehicle frame assembly may further include connecting brackets provided to connect the floor cross member and the body side sill to each other.

The connecting brackets may include an upper bracket supporting at a first surface thereof an upper surface of the stiffener. The connecting brackets may also include a reinforcing bracket supporting at a first surface thereof a lower surface of the floor cross member, and connected at a second surface thereof to the upper bracket. The upper bracket and the reinforcing bracket are on opposite sides of an inner surface of the body side sill.

The upper bracket and the reinforcing bracket may be formed in a gusset structure to connect the stiffener and the floor cross member to each other.

The stiffener may be provided in the internal space of the body side sill to extend in a longitudinal direction of the vehicle.

The chassis frame may include left and right chassis frame side members extending in the longitudinal direction of the vehicle. The chassis frame may also include a chassis frame cross member provided on a rear of the battery pack to connect the left and right chassis frame side members.

A chassis stay may be formed on the chassis frame side member to extend from an outer surface or a lower surface thereof.

The vehicle frame assembly may further include a body mounting bracket connecting the body side sill and the chassis frame side member to each other.

A first surface of the body mounting bracket may support an upper surface of the chassis stay, and a second surface thereof may support a surface of the body side sill.

The connecting brackets and the body mounting bracket connecting the floor cross member and the body side sill to each other may be connected to the floor cross member, the body side sill, and the chassis frame to form the load path for the impact from a broadside collision.

A battery side member may extend outwards, and a coupling part may be provided on an outwardly extending portion to be vertically coupled to the chassis frame side member.

The vehicle frame assembly may further include a reinforcing structure provided on a top of the stiffener. A surface thereof is formed to face an end of the floor cross member.

A lower portion of the stiffener may be fastened to the chassis stay through a fastening structure using a bolt that passes through the body side sill.

A plurality of floor cross members may be provided on the vehicle body floor to be spaced apart from each other in the longitudinal direction of the vehicle. At least one of the plurality of floor cross members may be provided above the chassis frame cross member and may be fastened to the chassis frame side member to couple the vehicle body and the chassis frame to each other.

An end of the floor cross member may be in surface contact with and connected to an inner surface of the body side sill.

The vehicle frame assembly may further include a door arm configured to control opening or closing of the vehicle sliding door. The door arm may be provided above the body side sill.

The door arm may be bent upwards from an outside of the body side sill and then be extended.

The chassis frame may be configured to be separable from the floor cross member of the vehicle body and the body side sill.

According to the vehicle frame assembly having the structure described above, it can form a load path for an impact resulting from a broadside collision through a highly efficient connecting structure. This structure connects a battery cross member, a chassis frame side member, a body side sill, and a floor cross member in a configuration where a sliding door is applied to the vehicle. As a result, the vehicle frame assembly maximizes the torsional rigidity and connectivity of a vehicle. Additionally, the vehicle frame assembly can distribute an excessive load caused by a large-capacity battery mounted on a lower portion of the vehicle to each member, thereby improving safety against the impact from the broadside collision.

The effects to be achieved by the present disclosure are not limited to the above-mentioned effects, and other effects which are not mentioned herein should be clearly understood by those having ordinary skill in the art from the following description.

BRIEF DESCRIPTION OF THE DRAWINGS

Since these drawings are for reference in explaining embodiments of the present disclosure, the technical idea of the present disclosure should not be construed as limited to the accompanying drawings.

DETAILED DESCRIPTION

Figure 1:
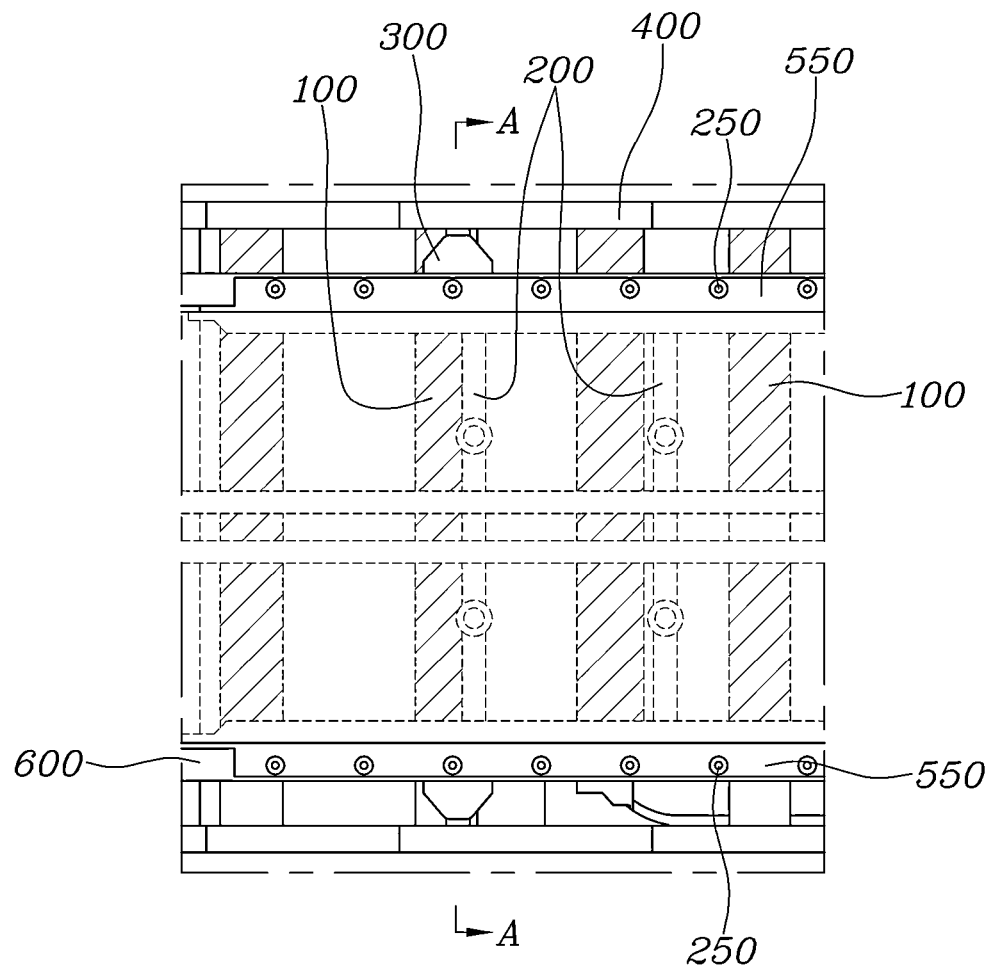
FIG. 1 is a top view showing a vehicle frame assembly according to an embodiment of the present disclosure.

In the following specification or application, specific structural or functional descriptions in the embodiments of the present disclosure are only intended for describing the embodiments of the present disclosure. The descriptions should not be construed as being limited to the embodiments described in the specification or application.

Since embodiments of the present disclosure may be changed in various ways and may have various forms, specific embodiments are illustrated in the drawings and described in detail in the specification. However, the present disclosure should not be construed as being limited to only the embodiments set forth herein, but should be construed as covering modifications, equivalents, or alternatives falling within the spirit and technical scope of the present disclosure.

Unless differently defined, all terms used herein including technical or scientific terms have the same meanings as the terms generally understood by those having ordinary skill in the art to which the present disclosure pertains. The terms identical to those defined in generally used dictionaries should be interpreted as having meanings identical to contextual meanings of the related art. Such terms should not be interpreted as being ideally or excessively formally defined unless they are explicitly defined in the present specification.

Hereinafter, embodiments of the present disclosure are described in detail with reference to the accompanying drawings. In the following description of the present disclosure, the same reference numerals are used to designate the same or similar elements throughout the drawings.

When a component is referred to as being "connected" to or "in contact" with another component, it should be understood that it may be directly connected to or in contact with the other component, but other components may exist therebetween. On the other hand, when a component is referred to as being "directly connected" to or "directly in contact" with another component, it should be understood that there is no other component therebetween.

When a component, device, element, or the like of the present disclosure is described as having a purpose or performing an operation, function, or the like, the component, device, or element should be considered herein as being "configured to" meet that purpose or to perform that operation or function.

According to an embodiment of the present disclosure, it is proposed that a body side sill, a battery cross member, a chassis frame, and a floor cross member form a load path for an impact caused from a broadside collision.

FIG. 1 is a top view showing a vehicle frame assembly according to an embodiment of the present disclosure. FIG. 1 mainly shows components related to the embodiment, and fewer or more components may be included in an actual vehicle implementation.

Referring to FIG. 1, according to one embodiment of the present disclosure, the vehicle frame assembly may include a battery cross member 200, a chassis frame (600, 700), floor cross members 100, body side sills 400, and connecting brackets (1000, 1100). The connecting brackets include an upper bracket 1000 and a reinforcing bracket 1100.

The battery cross member 200 is a component of a battery pack 210, and extends from the battery pack 210 in the widthwise direction of the vehicle. In order to optimize the center of gravity of the battery pack 210, the battery cross member 200 may be provided on a lower portion of the vehicle. Further, the battery cross member 200 may be mounted on the chassis frame in a state where the battery pack 210 is mounted on the chassis frame.

The chassis frame may include left and right chassis frame side members 600 and a chassis frame cross member 700. The chassis frame side members 600 (i.e., the left and right chassis frame side members) may extend in the longitudinal direction or lengthwise direction of the vehicle to support the battery pack 210 from the sides of the vehicle. The chassis frame cross member 700 may connect the left and right chassis frame side members 600 at the rear of the battery pack 210.

Further, the chassis frame side members 600 may extend in the longitudinal direction of the vehicle and may be connected to respective sides of the battery cross member 200. The chassis frame side members 600 are connected to the battery cross member 200 and are disposed in the vehicle body frame. In one embodiment, the chassis frame side members 600 may be disposed between inner sides of the body side sills 400 (described further below) and outer sides of the battery cross member 200. Further, battery side members 550 may be provided, respectively, on both sides of the battery pack 210 (i.e., the left and right sides) to be vertically fastened to the chassis frame side members 600 via coupling parts 250.

Further, the floor cross members 100 may be spaced apart from each other while maintaining a predetermined distance so as to distribute a load applied in the vertical or horizontal direction of the vehicle. Each floor cross member 100 may be connected to each body side sill 400 to increase the rigidity of the entire frame assembly. A body floor of the vehicle may provide a space for accommodating a passenger and a space for loading luggage. A plurality of floor cross members 100 may be provided in the latitudinal direction or widthwise direction of the vehicle and may be provided on the body floor of the vehicle. In one embodiment, at least one of the floor cross members 100 may be provided above the chassis frame cross member 700. The floor cross members 100 may be fastened to the chassis frame side members 600 such that the vehicle body is coupled to the chassis frame (600, 700), thus maximizing the torsional rigidity and connectivity of the vehicle.

Each end of the floor cross members 100 may be in surface contact with and connected to an inner surface of each body side sill 400 extending in the longitudinal direction of the vehicle. Two body side sills 400 may be located outside the chassis frame (600, 700) and the floor cross members 100 at the edge of the body frame. As mentioned above, the two body sills 400 may be provided in the longitudinal direction of the vehicle. Further, the floor cross members 100 may extend in the widthwise direction of the vehicle and may be provided to be spaced apart from each other at regular intervals (i.e., at predetermined distances).

A method of forming the load path for an impact resulting from a broadside collision through a reinforcing bracket 1100 and a reinforcing structure 150 is described below. A floor cross member 100 is in surface contact with the inner surface of the body side sill 400 to form the load path for the impact from the broadside collision.

As mentioned above, the body side sill 400 may extend in the longitudinal direction of the vehicle and may be disposed outside the chassis frame (600, 700) and the floor cross member 100. The body side sill 400 may define an internal space, and the stiffener 1050 may be fixedly disposed in a lower portion of the internal space of the body side sill 400 to increase stability, thereby lowering the center of gravity. Thus, the stiffener 1050 may be disposed in the internal space of the body side sill 400 to extend in the longitudinal direction of the vehicle. As a result, the configuration may advantageously increase rigidity against the impact from the broadside collision.

The floor cross member 100 and the body side sill 400 are components of an upper body. In this configuration, the chassis frame (600, 700) may be coupled to the upper body, and the chassis frame (i.e., 600 and 700) may be configured to be separable from the floor cross member 100 and the body side sill 400 of the upper body.

For example, one surface of the upper bracket 1000 may be connected to the stiffener 1050, while the other surface thereof may be connected to the inner surface of the body side sill 400. Additionally, one surface of the reinforcing bracket 1100 may be connected to the inner surface of the body side sill 400, while the other surface thereof may be connected to the floor cross member 100. As a result, the body side sill 400 and the floor cross member 100 may form the load path against the impact caused by the broadside collision. The internal space of the body side sill 400 may be divided into an upper space and a lower space. A surface of the upper bracket 1000 may be secured to the upper portion of the stiffener 1050 that is secured to the internal space of the body side sill 400. Additionally, a surface of the reinforcing bracket 1100 may be secured to the inner surface of the body side sill 400.

The connecting brackets including the upper bracket 1000 and the reinforcing bracket 1100 is described below in detail.

Figure 2:
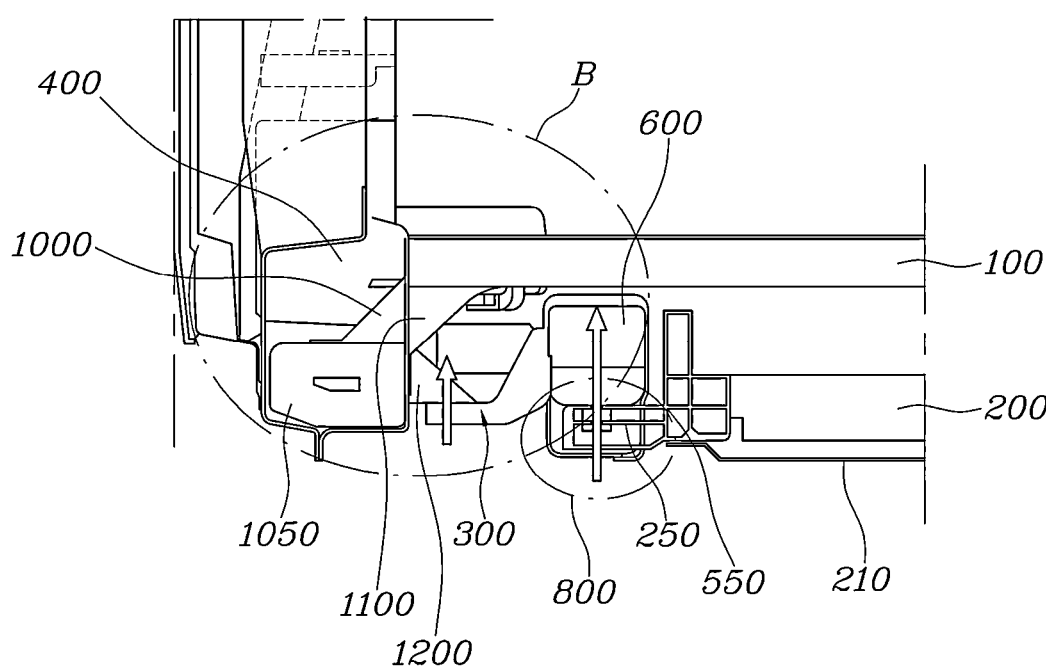
FIG. 2 is a sectional view taken along line A-A of FIG. 1.

FIG. 2 is a cross section view taken along line A-A of FIG. 1.

Referring to FIG. 2, a lower surface of the upper bracket 1000 may be secured to an upper surface of the stiffener 1050. The upper bracket 1000 may be connected to the reinforcing bracket 1100 with the brackets being on opposite sides of the inner surface of the body side sill 400. Further, one surface of the reinforcing bracket 1100 may support the lower surface of the floor cross member 100, and the other surface thereof may support the inner surface of the body side sill 400.

To be more specific, the reinforcing bracket 1100 may connect the upper bracket 1000 to the floor cross member 100, which is outside the body side sill 400. One surface of the reinforcing bracket 1100 may support the lower surface of the floor cross member 100.

As shown in FIG. 2, the lower surface and the side surface of the upper bracket 1000 provide support, and the upper surface and the side surface of the reinforcing bracket 1100 provide support, thus the upper bracket 1000 and the reinforcing bracket 1100 form the load path along with the body side sill 400 and the floor cross member 100. As a result of the configuration, the torsional rigidity and connectivity of the vehicle is maximized.

The shapes of the upper bracket 1000 and the reinforcing bracket 1100 are a very important factor to maximize the torsional rigidity and connectivity of the vehicle. As the floor height of the vehicle is lowered and the sliding door structure is applied, the body side sill 400 moves down and simultaneously a height difference between the stiffener 1050 and the floor cross member 100 increases. Thus, it is desirable that the stiffener 1050 and the floor cross member 100 are connected in an inclined manner so as to compensate for the height difference and simultaneously increase the rigidity and connectivity against the impact from the broadside collision. To this end, the upper bracket 1000 and the reinforcing bracket 1100 may be formed in a gusset structure to connect the stiffener 1050 and the floor cross member 100 to each other. The gusset structure may compensate for the height difference between the stiffener 1050 and the floor cross member 100 while simultaneously transmitting a load for the impact from the broadside collision. The load is transmitted through the stiffener 1050 to the floor cross member 100. On the other hand, it should be apparent to those having ordinary skill in the art that the directions of the upper bracket 1000 and the reinforcing bracket 1100 may be variously changed. For instance, the upper bracket 1000 and the reinforcing bracket 1100 may be arranged to be parallel to each other.

Figure 3:
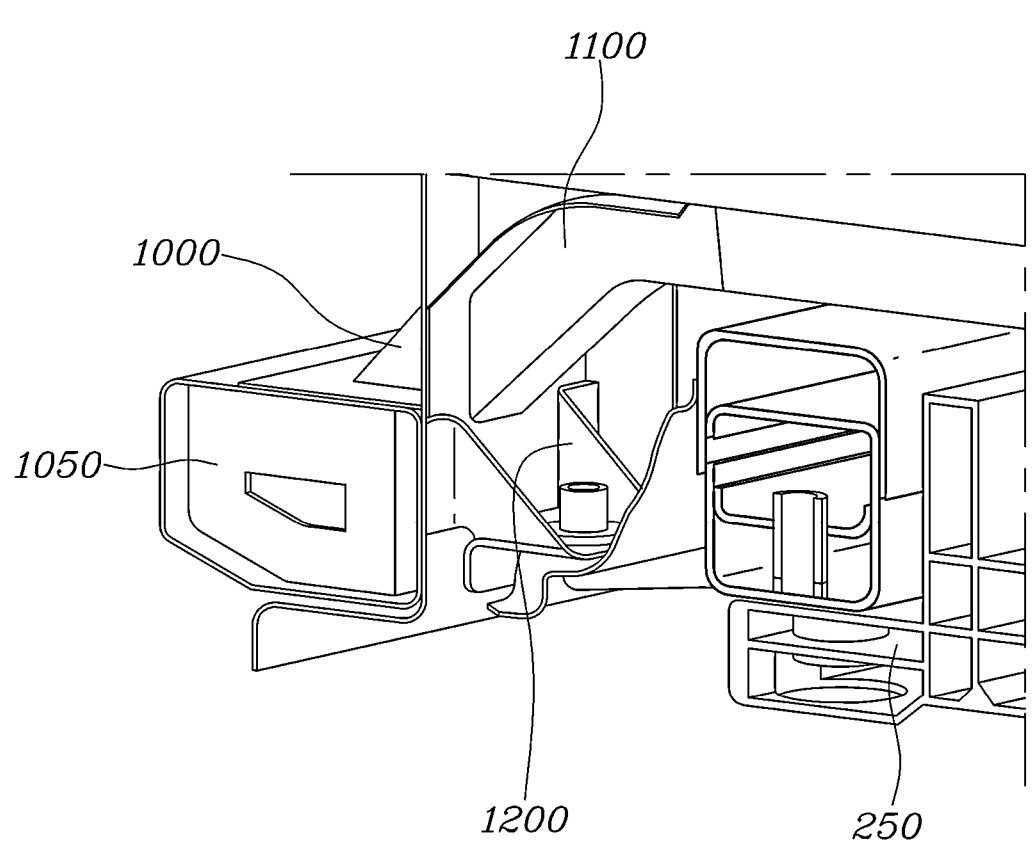
FIG. 3 is a view showing portion B encircled in FIG. 2.

FIG. 3 is a view showing portion B that is encircled in FIG. 2.

Referring to FIG. 3, a body mounting bracket 1200 may be coupled to the chassis stay 300 to connect the body side sill 400 and the chassis frame side member 600 to each other, thereby allowing a load to be transmitted in the event of the vehicle broadside collision. Thus, the body side sill 400 may form the load path for the impact from the broadside collision along with the floor cross member 100, the chassis frames 600 and 700, and the battery cross member 200.

To be more specific, in the event of the vehicle broadside collision, the load is transmitted to the floor cross member 100 at the upper portion in the body side sill 400, and is also transmitted to the battery cross member 200 at the lower portion in the body side sill 400. As the floor height is lowered and the sliding door structure is applied, the body side sill 400 moves down and simultaneously a height difference between the body side sill 400 and the chassis frame 600 or 700 increases. Thus, the body mounting bracket 1200 connects the body side sill 400 and the chassis frames 600 and 700 to compensate for the height difference and simultaneously increase the rigidity and connectivity against the impact resulting from the broadside collision. The body mounting bracket 1200 is formed in an inclined shape.

Therefore, the body mounting bracket 1200 may be formed in the gusset structure similarly to the above-described upper bracket 1000 and reinforcing bracket 1100.

Thus, the body mounting bracket 1200 connects the body side sill 400 and the chassis frame (i.e., members 600 and 700).

The gusset structure may maximize the rigidity and connectivity against the impact resulting from the broadside collision. Further, the gusset structure may compensate for the height difference between the body side sill 400 and the chassis frame (i.e., 600 or 700) while simultaneously transmitting the load for the impact from a broadside collision, which is acting on the body side sill 400, to the chassis frame (i.e., 600 and 700). On the other hand, it should be apparent to those having ordinary skill in the art that the direction of the inclined body mounting bracket 1200 may be variously changed. For instance, the direction of the inclined body mounting bracket 1200 may adopt a parallel direction. One surface of the body mounting bracket 1200 supports the upper surface of the chassis stay 300 that is described below. The other surface supports a surface of the body side sill 400. As a result, the configuration forms the load path in a direction toward the lower end of the body side sill 400.

Turning back to FIGS. 1 and 2, the coupling part 250 may be provided on a portion extending laterally from the battery side member 550. A plurality of coupling parts 250 may be provided to couple the respective chassis frame side member 600 to the battery pack 210 in a vertical direction. Such a first fastening structure 800 is advantageous to protect the battery pack 210 and can increase vehicle stability against the impact from the broadside collision. Further, the chassis stay 300 may extend from the outer surface or lower surface of the respective chassis frame side members 600. The chassis stay 300 may be fastened and connected to the lower portion of the stiffener 1050 that is described below or may be fastened to the body mounting bracket 1200, thus further maximizing the torsional rigidity and connectivity of the vehicle.

Figure 4:
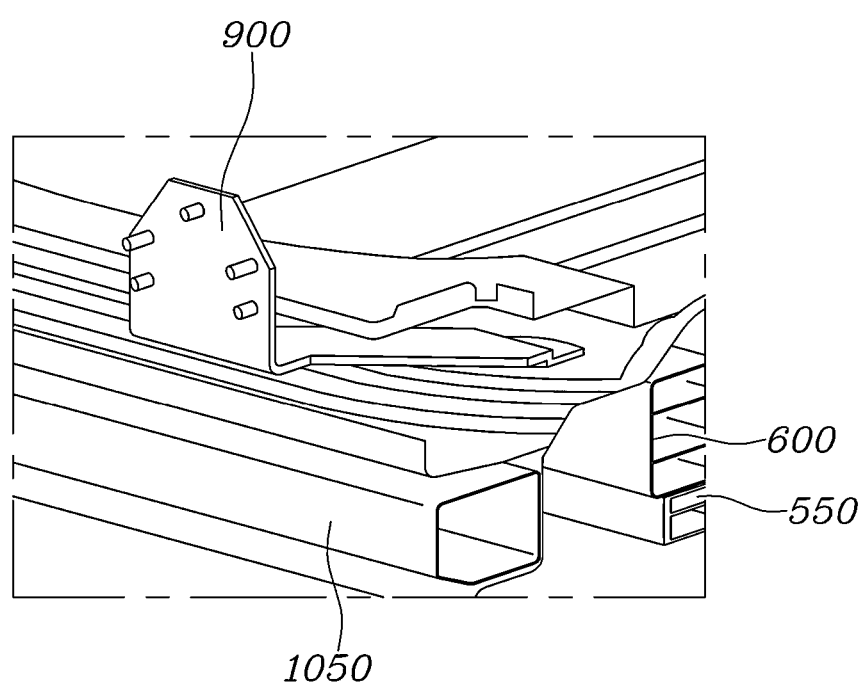
FIG. 4 is a view showing a door arm that controls the opening or closing of a vehicle sliding door.

FIG. 4 is a view showing a door arm 900 that controls the opening or closing of the vehicle sliding door.

As shown in FIG. 4, the door arm 900 may be configured to control the opening or closing of the vehicle sliding door in a sliding manner. The door arm 900 is bent upwards from the outside of the body side sill 400 and then is extended outwards. Thus, the sliding door of the vehicle may be secured to the body side sill 400 and simultaneously secured in the direction of the vehicle's gravitational force (e.g., the downward direction in which gravity acts on the vehicle).

Figure 5:
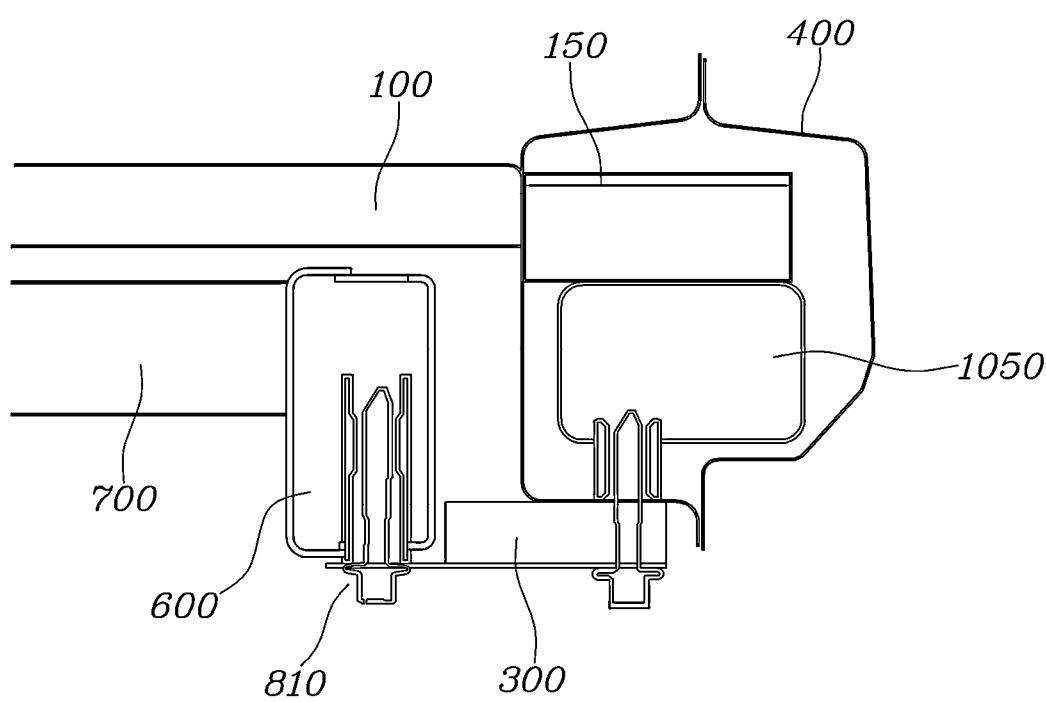
FIG. 5 is a view showing a reinforcing structure provided on an upper portion of a stiffener according to an embodiment of the present disclosure.

FIG. 5 is a view showing the reinforcing structure 150 according to an embodiment of the present disclosure.

Referring to FIG. 5, instead of the connecting brackets 1000 and 1100, the reinforcing structure 150 may be disposed on the top of the stiffener 1050, which is secured to the internal space of a respective body side sill 400. The reinforcing structure 150 may be secured to the top of the stiffener 1050 and may be formed such that a surface thereof faces an end of the floor cross member 100. Since the reinforcing structure 150 may form the load path for the impact from a broadside collision along with the body side sill 400 and the floor cross member 100, according to the embodiment, the reinforcing structure 150 may take the place of the upper bracket 1000 and the reinforcing bracket 1100.

Further, a second fastening structure 810 shown in FIG. 5 is a structure in which the chassis stay 300 is bolted vertically to the chassis frame side member 600. Such a fastening structure may increase the coupling strength of the body side sill 400 and the chassis frame members 600 and 700.

Thus, the same effect can be attained without installing a separate gusset structure such as the connecting brackets 1000 and 1100 and the body mounting bracket 1200.

Figure 6:
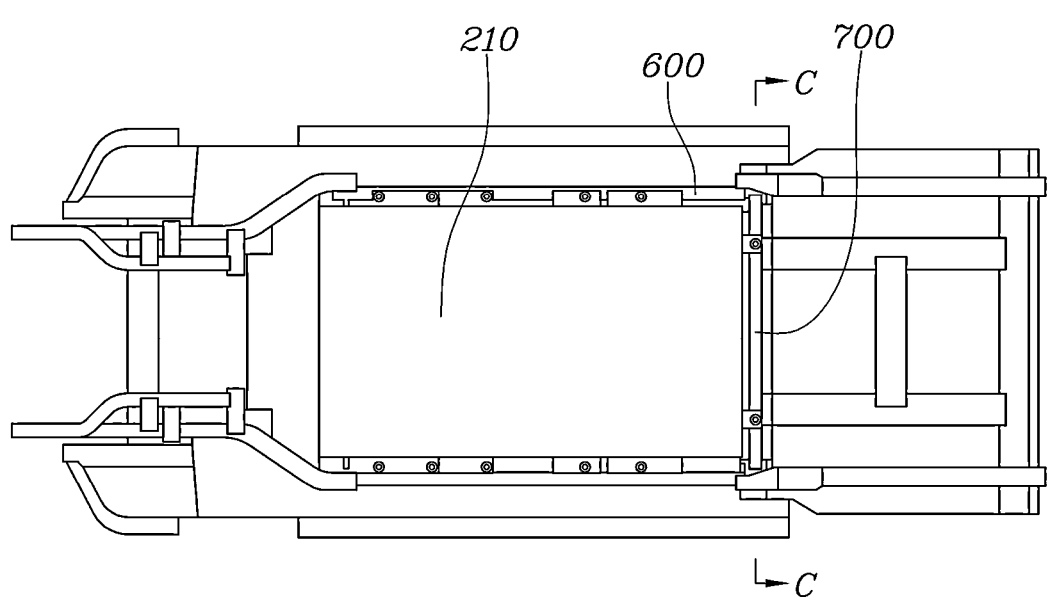
FIGS. 6 and 7 are views showing a structure in which a lower portion of the stiffener is fastened to a chassis stay in section C.
Figure 7:
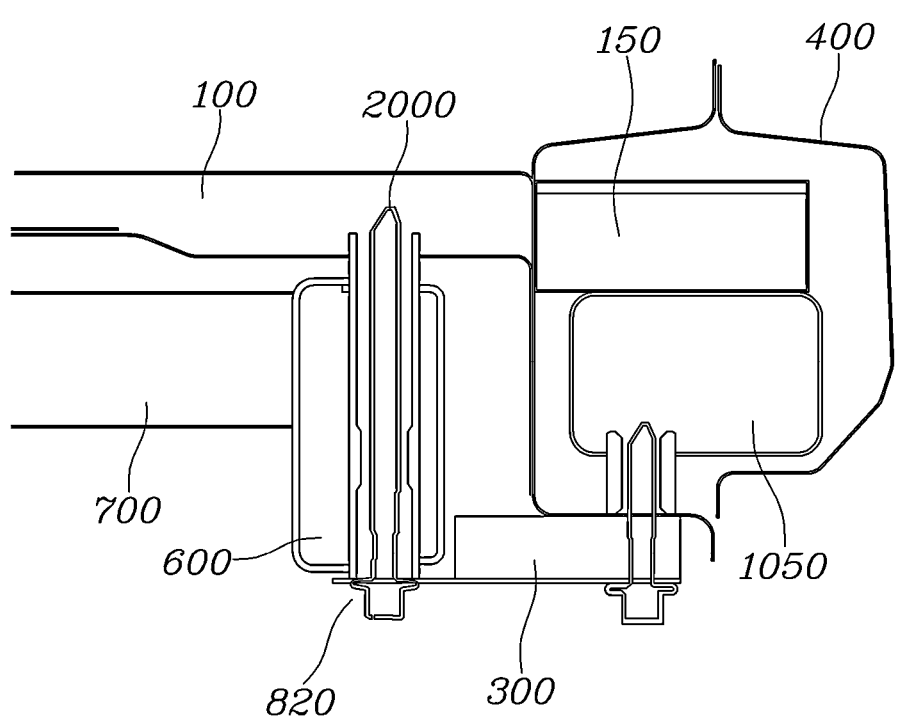

FIGS. 6 and 7 are views showing a structure in which the lower portion of the stiffener 1050 is fastened to the chassis stay 300 in section C.

Referring to FIGS. 6 and 7, the chassis stay 300 may be connected to the lower portion of the stiffener 1050. When the chassis stay 300 is directly connected to the lower portion of the stiffener 1050, the load path may be formed in the direction toward the lower end of the body side sill 400. Thus, according to the embodiment, the same effect can be expected without installing a separate gusset structure such as the body mounting bracket 1200. Further, according to the embodiment, the reinforcing structure 150 may take the place of the connecting brackets 1000 and 1100, so it is unnecessary to install separate connecting brackets 1000 and 1100.

Therefore, the lower portion of the stiffener 1050 may be fastened to the chassis stay 300 via a fastening structure using a bolt passing through the body side sill 400. In detail, as shown in FIG. 5, the stiffener may be fastened to the chassis stay through the bolting structure in which a pipe (not shown) is first inserted and a bolt is inserted into and fastened to the pipe (not shown). The chassis stay 300 is vertically coupled to the lower portion of the stiffener 1050, thus increasing vehicle stability against the impact from the broadside collision.

Further, the chassis frame cross member 700 may extend in the widthwise direction of the vehicle under the floor cross member 100. The chassis frame cross member 700 may be vertically fastened to the floor cross member 100, thus forming the load path for the impact from the broadside collision. As shown in FIG. 7, the chassis frame cross member 700 may be provided under the floor cross member 100. Additionally, the floor cross member 100 may be directly fastened to the chassis frame side member 600 that is connected to the chassis frame cross member 700 through a penetrating portion 2000.

In this regard, the penetrating portion 2000 may form a third fastening structure 820. The third fastening structure 820 is a structure in which the chassis stay 300 is vertically fastened to the chassis frame side member 600 via the bolt. Such a fastening structure can increase the coupling strength of the body side sill 400 and the chassis frame members 600 and 700. In addition, the chassis frame cross member 700 and the floor cross member 100 are directly fastened in the vertical direction, thus forming an annular load path for the impact from the broadside collision. The floor cross member 100 and the chassis frame cross member 700 are fastened to each other in the vertical direction, which is the direction of the vehicle's gravitational force, in terms of coupling stability.

As described above, the present disclosure provides a vehicle frame assembly, which forms one load path for an impact from a broadside collision through an efficient connecting structure between a battery cross member, a chassis frame side member, a body side sill, and a floor cross member in a structure in which a sliding door is applied to a vehicle, thereby maximizing the torsional rigidity and connectivity of a vehicle, and which can distribute an excessive load caused by a large-capacity battery mounted on a lower portion of the vehicle to each member, thereby improving safety against the impact from a broadside collision.

Although the present disclosure was provided above in relation to specific embodiments shown in the drawings, it should be apparent to those having ordinary skill in the art that the present disclosure may be changed and modified in various ways without departing from the spirit and scope of the inventive concept, which is described in the following claims.

What is claimed is:

1. A vehicle frame assembly comprising:
a floor cross member provided on a body floor of a vehicle, and extending in a widthwise direction of the vehicle;
a body side sill provided on an outside of the vehicle of the floor cross member, connected to the floor cross member, and defining an internal space; and
a chassis frame provided on a lower portion of a vehicle body and disposed inside the vehicle compared to the body side sill
wherein a battery pack is mounted on the chassis frame, and the body side sill is connected to a side of the chassis frame,
wherein a stiffener is secured in the internal space of the body side sill, and
wherein the floor cross member, the body side sill, and the chassis frame are connected to each other and configured to form a load path for an impact caused by a broadside collision.

2. The vehicle frame assembly of claim 1, further comprising:
connecting brackets provided to connect the floor cross member and the body side sill to each other.

3. The vehicle frame assembly of claim 2, wherein the connecting brackets comprise:
an upper bracket supporting at a first surface thereof an upper surface of the stiffener;
a reinforcing bracket supporting at a first surface thereof a lower surface of the floor cross member, and connected at a second surface thereof to the upper bracket; and
wherein the upper bracket and the reinforcing bracket are on opposite sides of an inner surface of the body side sill.

4. The vehicle frame assembly of claim 3, wherein the upper bracket and the reinforcing bracket are formed in a gusset structure to connect the stiffener and the floor cross member to each other.

5. The vehicle frame assembly of claim 1, wherein the stiffener is provided in the internal space of the body side sill to extend in a longitudinal direction of the vehicle.

6. The vehicle frame assembly of claim 1, wherein the chassis frame comprises left and right chassis frame side members extending in a longitudinal direction of the vehicle, and a chassis frame cross member provided on a rear of the battery pack to connect the left and right chassis frame side members.

7. The vehicle frame assembly of claim 6, wherein a chassis stay is formed on the chassis frame side member to extend from an outer surface or a lower surface thereof.

8. The vehicle frame assembly of claim 7, further comprising:
a body mounting bracket connecting the body side sill and the chassis frame side member to each other.

9. The vehicle frame assembly of claim 8, wherein a first surface of the body mounting bracket supports an upper surface of the chassis stay, and a second surface thereof supports a surface of the body side sill.

10. The vehicle frame assembly of claim 9, wherein connecting brackets and the body mounting bracket connecting the floor cross member and the body side sill to each other are connected to the floor cross member, the body side sill, and the chassis frame to form the load path for the impact from the broadside collision.

11. The vehicle frame assembly of claim 6, wherein a battery side member extends outwards, and a coupling part is provided on an outwardly extending portion to be vertically coupled to the chassis frame side member.

12. The vehicle frame assembly of claim 6, wherein a plurality of floor cross members is provided on the vehicle body floor to be spaced apart from each other in the longitudinal direction of the vehicle, and
wherein at least one of the plurality of floor cross members is provided above the chassis frame cross member, and is fastened to the chassis frame side member to couple the vehicle body and the chassis frame to each other.

13. The vehicle frame assembly of claim 1, further comprising:
a reinforcing structure provided on a top of the stiffener, a surface thereof being formed to face an end of the floor cross member.

14. The vehicle frame assembly of claim 13, wherein a lower portion of the stiffener is fastened to a chassis stay through a fastening structure using a bolt that passes through the body side sill.

15. The vehicle frame assembly of claim 1, wherein an end of the floor cross member is in surface contact with and connected to an inner surface of the body side sill.

16. The vehicle frame assembly of claim 1, further comprising:
a door arm configured to control opening or closing of a vehicle sliding door,
wherein the door arm is provided above the body side sill.

17. The vehicle frame assembly of claim 16, wherein the door arm is bent upwards from an outside of the body side sill and then is extended.

18. The vehicle frame assembly of claim 1, wherein the chassis frame is configured to be separable from the floor cross member of the vehicle body and the body side sill.

* * * * *